United States Patent [19]

Pearson

[11] Patent Number: 5,555,052
[45] Date of Patent: Sep. 10, 1996

[54] LIGHT SHIELDING APPARATUS

[75] Inventor: Douglas H. Pearson, Rochester, N.Y.

[73] Assignee: Eastman Kodak Company, Rochester, N.Y.

[21] Appl. No.: 327,251

[22] Filed: Oct. 21, 1994

[51] Int. Cl.⁶ .................................................. G03B 17/00
[52] U.S. Cl. .......................................... 354/203; 354/288
[58] Field of Search ..................... 354/203, 288, 354/277

[56] References Cited

FOREIGN PATENT DOCUMENTS

| | | |
|---|---|---|
| 6-175206 | 6/1994 | Japan . |
| 6-273830 | 9/1994 | Japan . |

*Primary Examiner*—David M. Gray
*Attorney, Agent, or Firm*—Peter J. Bilinski

[57] ABSTRACT

A camera is provided having a film roll chamber for holding an unexposed roll of film, an exposure chamber into which ambient light enters through a taking lens to impinge on the film, and a light blocking member for preventing light entering through the taking lens from entering the film roll chamber. According to the invention, the light blocking member includes a stepped piece having a first step sufficiently raised to prevent light from entering the film roll chamber and a second step raised above the first step for supporting edges of the film In a preferred embodiment, the light shielding member supports the emulsion side of the film.

7 Claims, 8 Drawing Sheets

LIGHT SHIELDING APPARATUS

FIELD OF THE INVENTION

The invention relates generally to the field of photography, and in particular to apparatus for preventing stray light from entering the film roll chamber of a camera.

BACKGROUND OF THE INVENTION

Typically, cameras include a film roll chamber for retaining an unexposed roll of film and an adjacent exposure gate which allows light to enter the camera in order to expose the film passing through the exposure gate along a film transport path. In most cameras, a light baffle positioned within the exposure gate diffuses the entering light to prevent the premature exposure of the film roll contained in the film roll chamber.

The light baffle operates most effectively in so called "normal" lighting conditions. However, in extreme lighting instances, such as bright sunlight, it is possible that stray light will not be effectively baffled and will enter the film roll chamber, thereby fogging portions of the film roll contained therein.

SUMMARY OF THE INVENTION

The present invention is directed to overcoming one or more of the problems set forth above. Briefly summarized, according to one aspect of the present invention, there is provided a camera comprising a film roll chamber for holding an unexposed roll of film, an exposure chamber into which ambient light enters through a taking lens to impinge on the film, and light blocking means for preventing light entering through said taking lens from entering said film roll chamber, characterized in that:

said light blocking means includes a stepped piece having a first step sufficiently raised to prevent light from entering said film roll chamber and a second step raised above said first step for supporting edges of the film.

According to another aspect of the present invention, there is provided a method of making a single-use camera from previously used camera parts, comprising the steps of:

loading an unexposed roll of film into a film cassette chamber; and prewinding the unexposed roll of film from the film cassette chamber over a stepped piece having a first step which is sufficiently raised to block light which can enter through a taking lens from entering a film roll chamber and a second step which is raised above said first step for supporting the edges of the film as it is prewound into the film roll chamber.

According to yet another aspect of the present invention, there is provided a single-use camera with an unexposed roll of film, comprising a film roll chamber for holding the unexposed roll of film, an exposure chamber into which ambient light enters through a taking lens to impinge on the film and light blocking means for preventing light entering through said taking lens from entering said film roll chamber, characterized in that:

said light blocking means includes a stepped piece having a first step sufficiently raised to prevent light from entering said film roll chamber and a second step raised above said first step for supporting edges of the film.

These and other aspects, objects, features and advantages of the present invention will be more clearly understood and appreciated from a review of the following Detailed Description of the Preferred Embodiments and appended claims, and by reference to the accompanying Drawings.

DETAILED DESCRIPTION OF THE INVENTION

A preferred embodiment of the present invention is herein described as pertaining to a recyclable single-use camera which is shown in FIGS. 1–9. For background purposes, in typical single-use cameras, a user exposes the film contained in the camera body and turns the entire film package; that is, the camera and the film contained therein to the photofinisher who unloads the film for development. In most cases, the filmstrip is initially prewound from a film cassette contained in a film cassette chamber of the camera body onto a take-up spool or into a take-up roll chamber of the camera body, so that as exposures are taken, the filmstrip is rewound into a film cartridge which is subsequently removed by a photofinisher. In cameras of this type, it is not intended for the camera per se to be reused, although some parts of the camera such as the front and rear cover, the camera body, and some of the supported camera parts such as the taking lens are ground down for recycling purposes. The remaining parts are typically discarded.

In this particularly described embodiment, however, a majority of previously used single-use camera parts can be reassembled in a recyclable single-use camera. It should be noted and will become readily apparent, however, that the present invention can be applied in other photographic cameras other than the recyclable single-use camera herein described.

Figure 1:
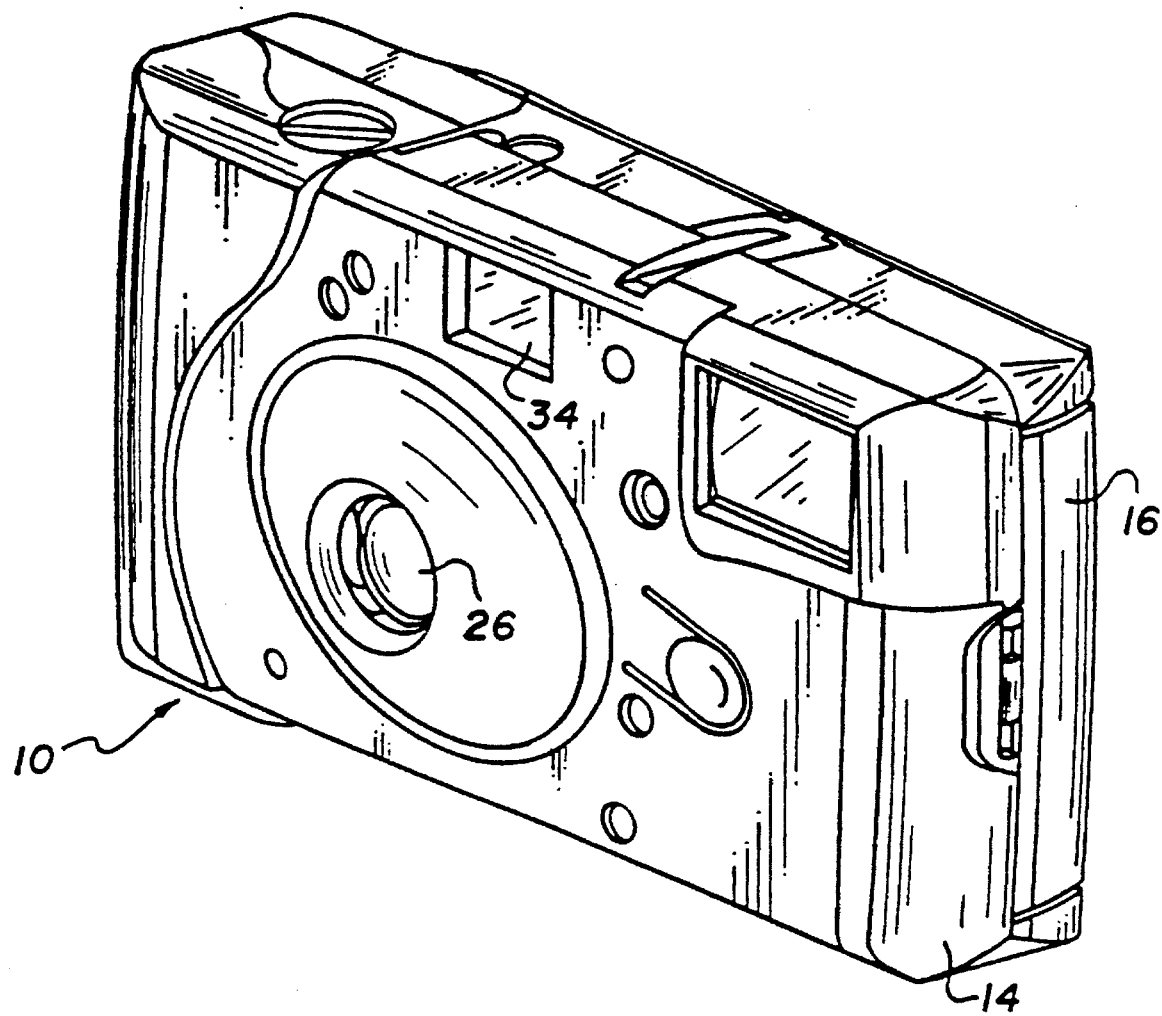
FIG. 1 is a front perspective view of a single-use camera according to a preferred embodiment.
Figure 2:
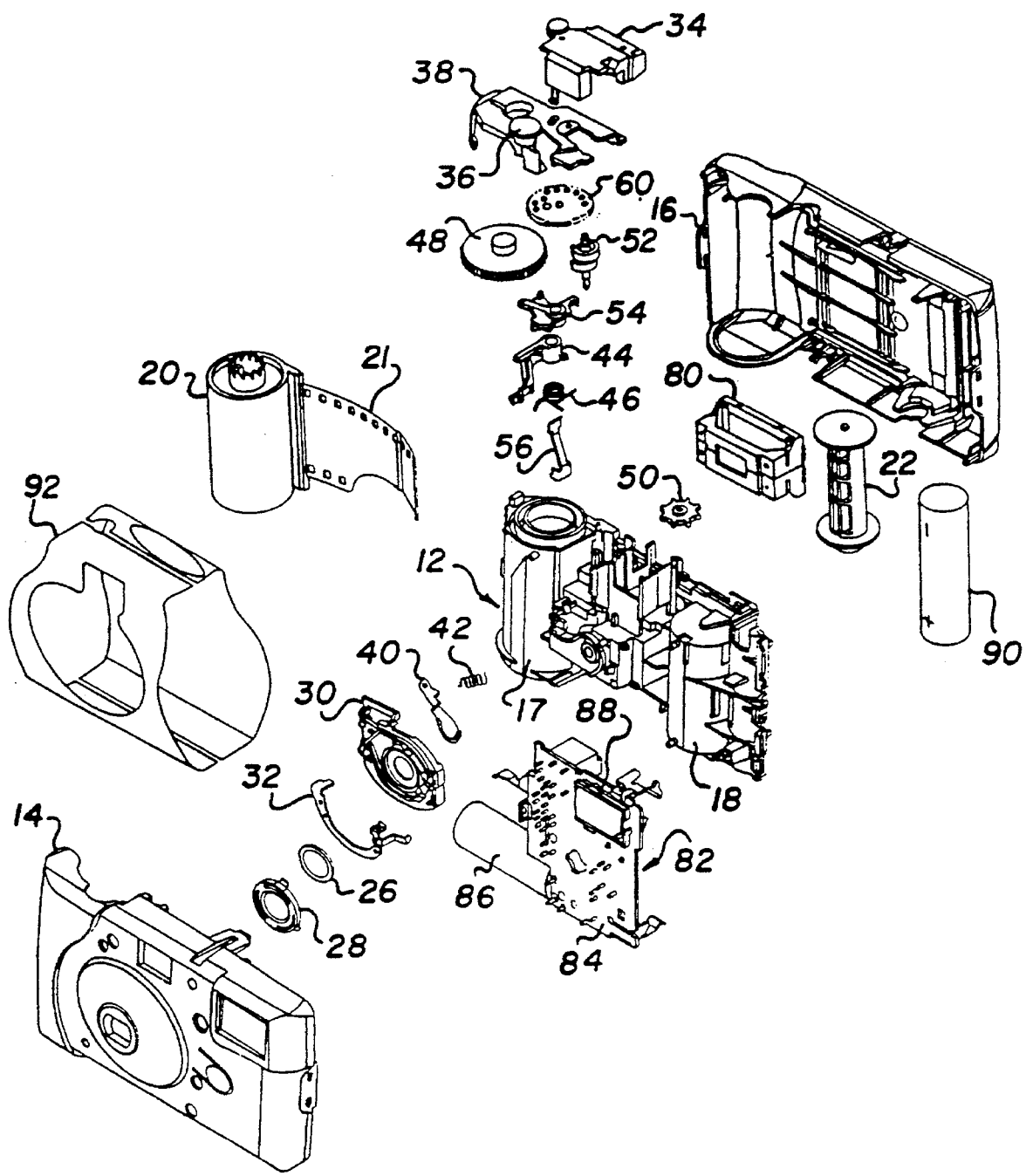
FIG. 2 is an exploded front perspective view of the camera of FIG. 1.

Referring first to FIGS. 1 and 2, the assembled single use camera 10 of the preferred embodiment comprises a main body 12, a front cover 14 which is attached to the front of the main body, and a rear cover 16 that is attached to the rear of the main body. Each of the main body 12, the front cover 14 and the rear cover 16 are formed from molded plastic parts.

Figure 4:
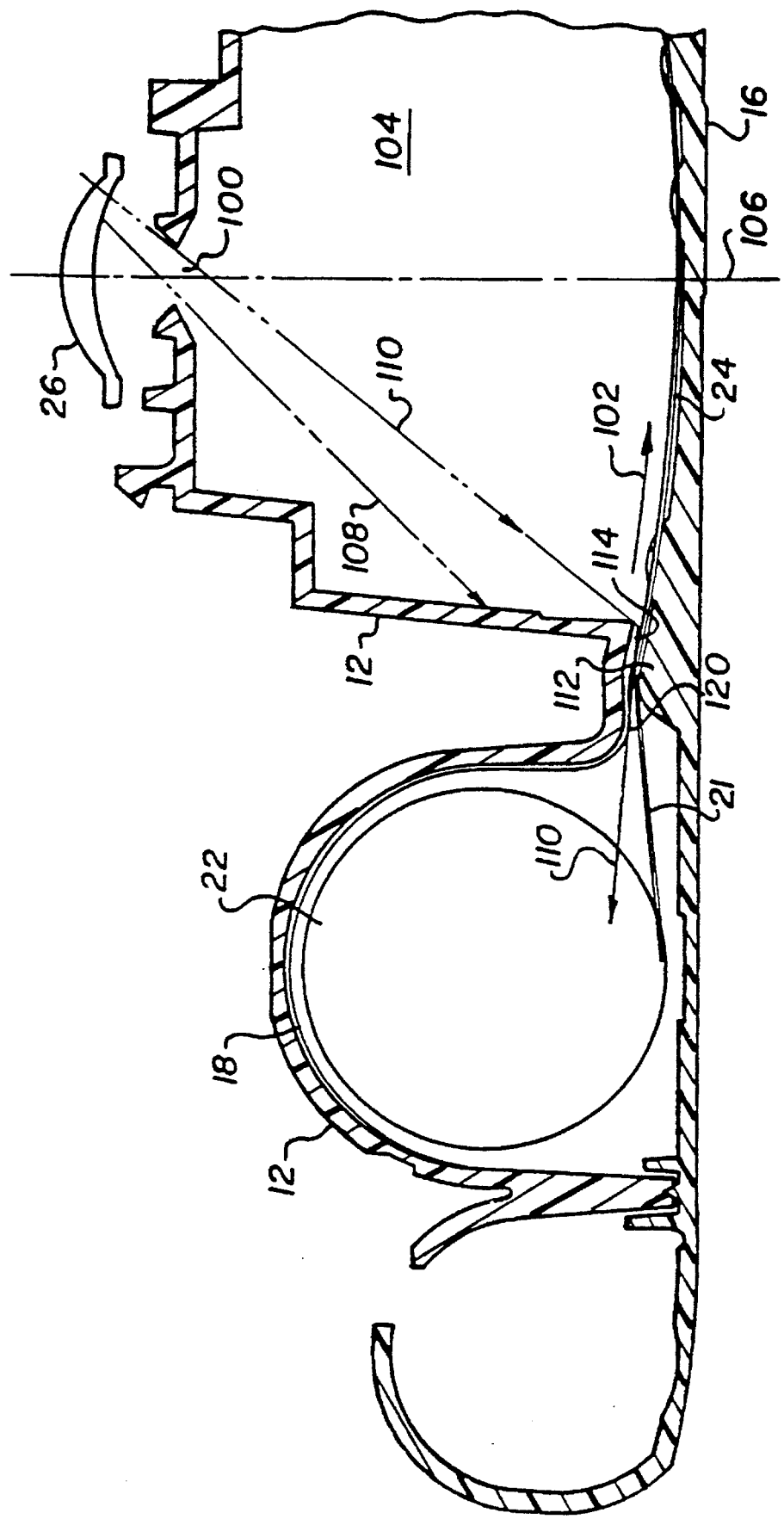
FIG. 4 is the top sectional view of a camera having light blocking means according to the prior art.

Referring now more particularly to the exploded camera detail shown in FIG. 2, the main body 12 includes a pair of formed chambers 17, 18 for retaining a film cassette 20 and a take-up spool 22, respectively. The chambers 17, 18 are oppositely disposed relative to an exposure gate 24, which is shown in FIG. 4. The body 12 additionally supports a number of camera parts which are attached thereto prior to the attachment of the covers 14, 16 which sandwich the body. These parts include a taking lens 26 which is attached to the front of the body 12 by means of a retainer 28 and a support plate 30, sandwiching the lens therebetween. A contact switch 32 is also attached to one side of the support plate 30. Other parts attached to the body 12 include a plastic viewfinder 34; a shutter mechanism consisting of a keeper plate 38 having a depressable shutter release portion 36 for tripping a shutter blade 40, which is biased by a spring 42 via a high-energy lever 44 which is also biased by a helical spring 46; a film advancing and metering mechanism consisting of a film winding knob 48 which engages the spool (not shown) of a loaded film cassette 20, a sprocket 50 for engaging edge perforations 23 of the film 21 having a spring biased portion extending into a rotatable cam 52 which engages a metering lever 54 biased by a spring 56, the cam 52 having an extending portion 58 for contacting the teeth of a frame counter 60; a light baffle 80 which is mounted into the rear of the body 12 and the exposure gate 24, FIG. 6; and a flash illumination assembly 82 including a circuit board 84, capacitor 86 and flashhead 88, which is powered by a battery 90. As noted above, the front and rear covers 14, 16 are sandwiched together with the body 12 to form an assembled camera 10. Finally, a label 92 is subsequently attached to the finished camera 10.

Figure 3:
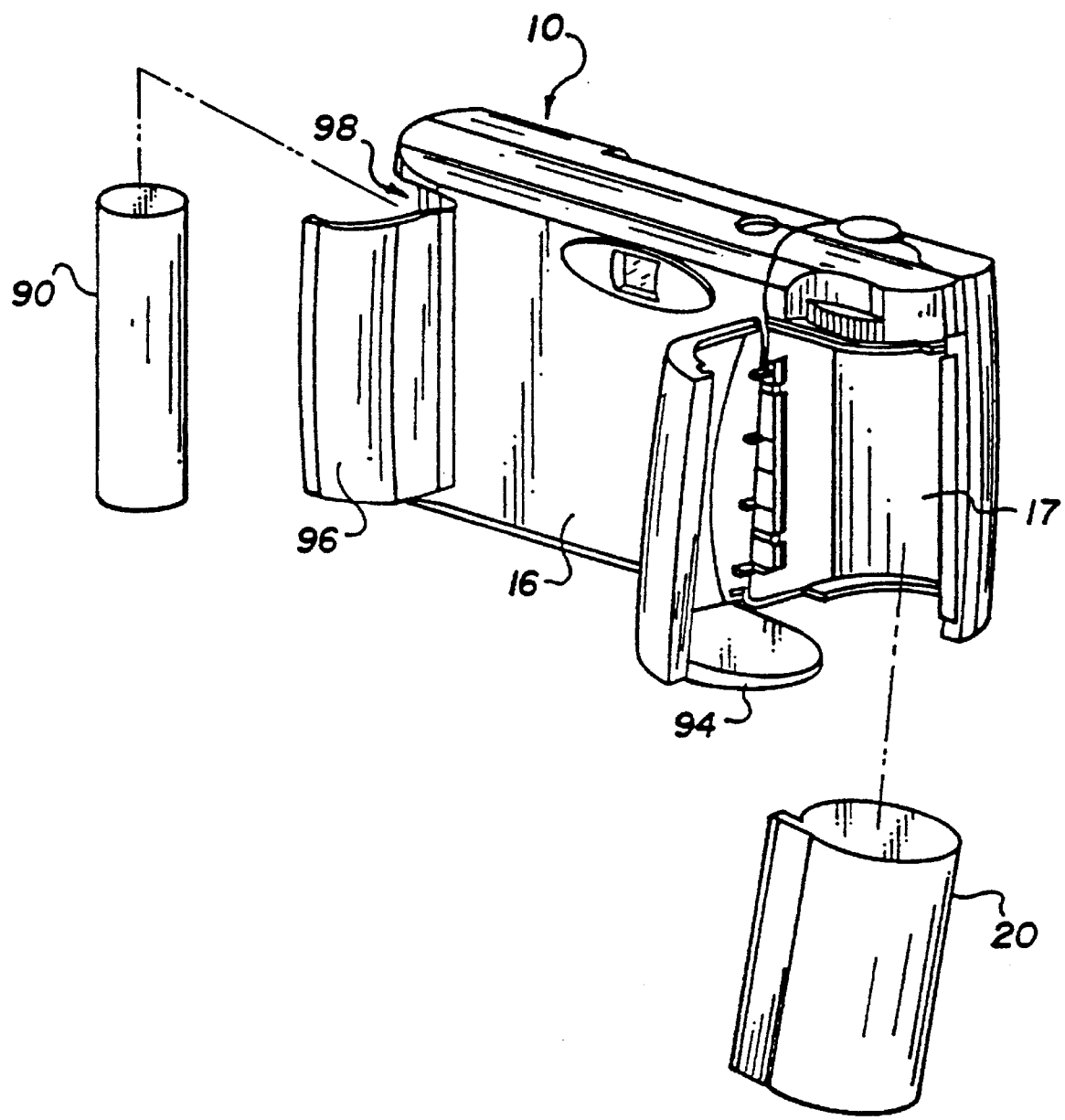
FIG. 3 is a top perspective view of the rear of the camera shown in FIGS. 1 and 2 showing the unloading of the film cassette and flash battery from the back of the camera.

Referring to FIG. 3, a breakaway door 94 is provided on the rear cover 14 which allows removal of the film cassette 20 from the film cassette chamber 17. The opening of the door 94 breaks the rear cover 14; that is, by destroying the light-tight integrity of the camera 10, but does not expose those parts which are supported by the camera body 12. Similarly, a second breakaway door 96 is also provided on the rear cover 14 to be opened by the photofinisher in order to remove the flash battery 90 from a battery compartment 98, if desired. These features are essential to the reusability of the previously used single-use camera parts supported by the camera body 12, as well as the body 12 itself.

Turning the emphasis to the present invention and referring now to FIG. 4, there is shown a partial top view of the camera 10 having light blocking means according to the prior art. The view depicts the camera body 12 having the attached rear cover 16, but does not depict the front cover 14, FIG. 2, which is not shown for ease of discussion. Exterior light enters the camera 10 through the taking lens 26 and an openable light portal 100 into an integral exposure chamber 104, the portal 100 being selectively openable by means of tripping the shutter blade 40, FIG. 2, in a manner conventionally known, such as by depressing the shutter release portion 36 of the keeper plate 38, FIG. 2, which uncocks the high energy lever 44, FIG. 2, thereby tripping the shutter blade 40, moving the blade from the portal 100.

The film 21 passes the exposure gate 24 and the exposure chamber 104 along a film transport path 102, the film extending from the take-up spool 22 which is housed and supported for rotation in the film take-up chamber 18. The light entering through the taking lens 26 and portal 100 impinges upon the film 21 as it passes from the film roll chamber 18 and across the exposure gate 24. A majority of the light passes directly through the opening 100 in a direction which is substantially parallel to the optical axis 104 of the lens 26. Other portions of the light, such as light ray 108 entering the camera 10 at more oblique angles are either absorbed or diffused by the light baffle 80, FIG. 2, which is disposed within the exposure gate 24. Still other portions of light, such as light ray 110, enters the opening 100 at a very steep angle, but usually contains less illumination energy than those rays which directly enter the camera, such as along axis 104. Though the light does impinge on the surface of the film 21, this light is usually absorbed.

In more extreme lighting situations, however, such as direct sunlight, the obliquely entering light rays 110 contain considerably more illumination energy. Therefore, as these light rays strike the surface of the film 21, it is possible that a portion of the light rays 110 will be reflected off the surface of the film 21 and into the film roll chamber 18 through the film passage 114 which is defined by the rear cover 16 and the camera body 12, thereby prematurely exposing a portion of the film.

As can be discerned from FIG. 4, a thickened portion 112 of the back cover 16 extending into the film passage 114 between the film roll chamber 18 and the exposure chamber 104 fails to adequately shield the film roll chamber from the reflected light ray 110.

Figure 5:
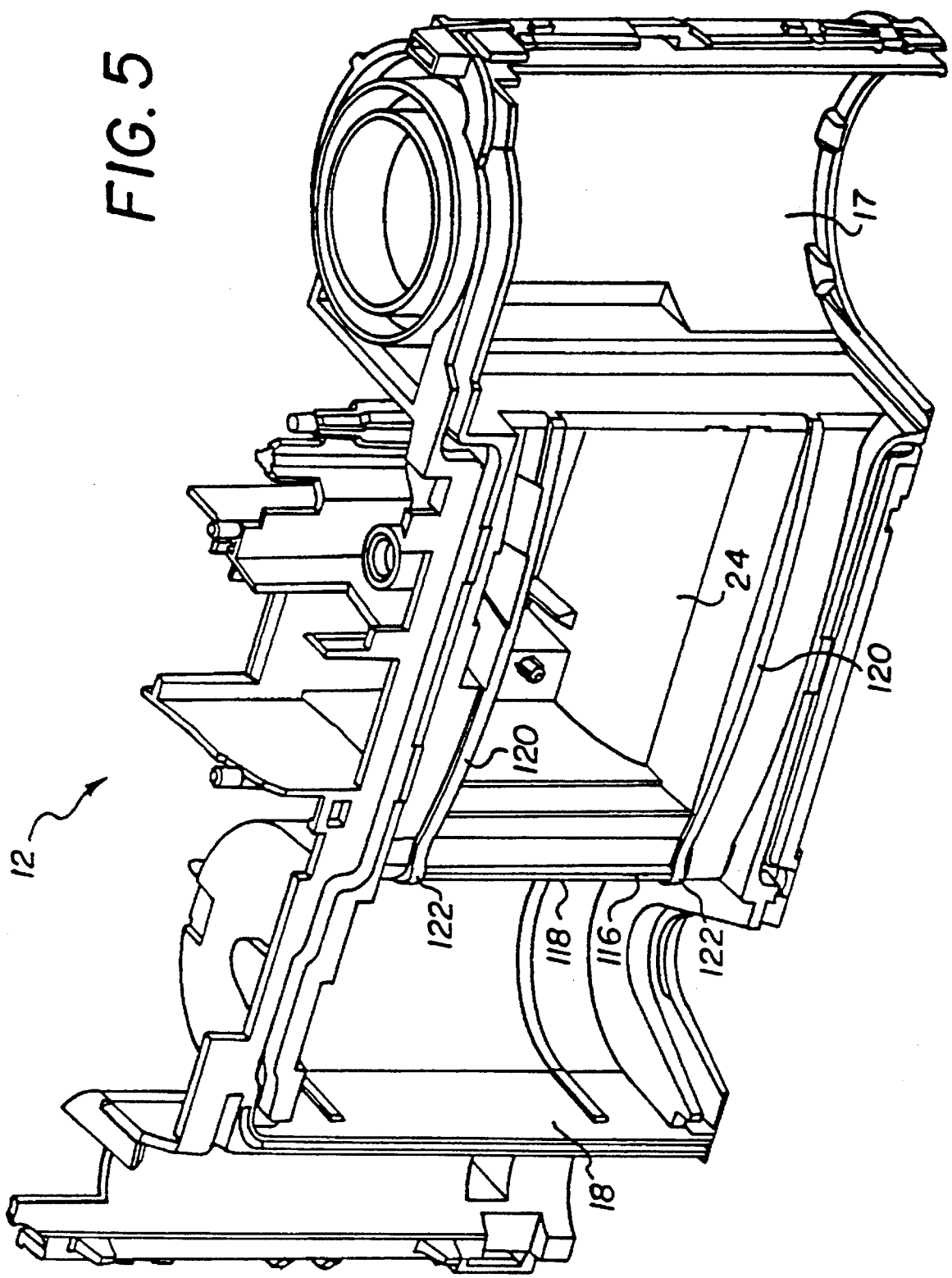
FIG. 5 is a partial top perspective view of the rear of the body of the camera in an unassembled condition.

The film 21 is supported for movement along the film transport path 102 by a set of rails 120 which border the upper and lower sides of the exposure gate 24 and extend from the film roll chamber 18 to the film cassette chamber 17, FIG. 5. The film transport path 102 extends between the film roll chamber 18 into which the film 21 is prewound from a film cassette 20 positioned within the film cassette chamber 17 and extends toward the film roll chamber 18 for prewinding and away from the film roll chamber for film advancing for exposure.

Turning to FIGS. 5–9, there is provided between the film roll chamber 18 and the exposure chamber 104, a light blocking member 116 according to the present invention, including a first stepped portion 118 and an adjacent second stepped portion 122. The light blocking member 116 is preferably formed as an integral portion of the camera body 12 extending into the film passage 114 and the film transport path 102.

Figure 6:
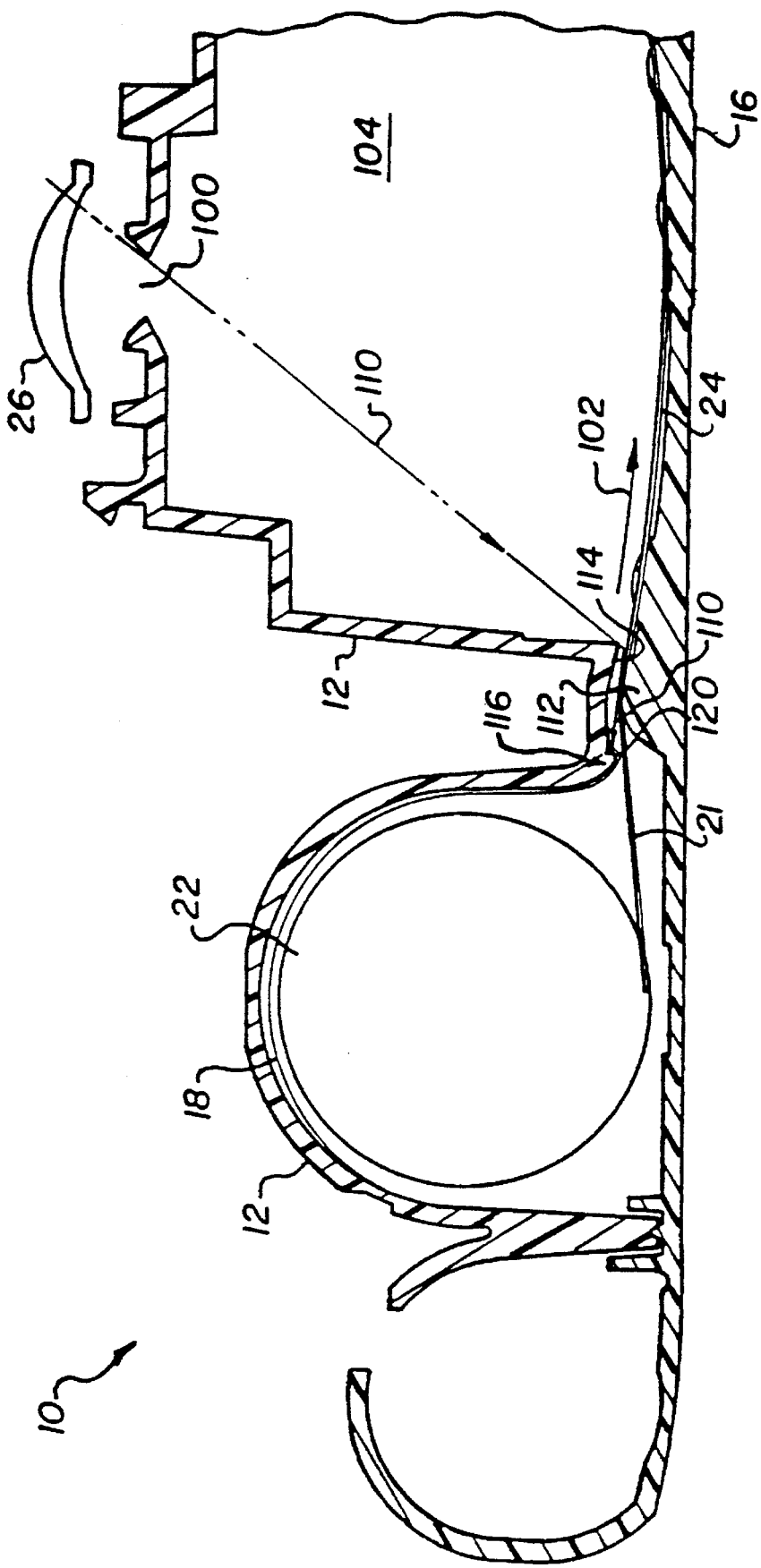
FIG. 6 is the partial top sectional view of the camera of FIG. 5 including a light blocking member according to an embodiment of the present invention.
Figure 7:
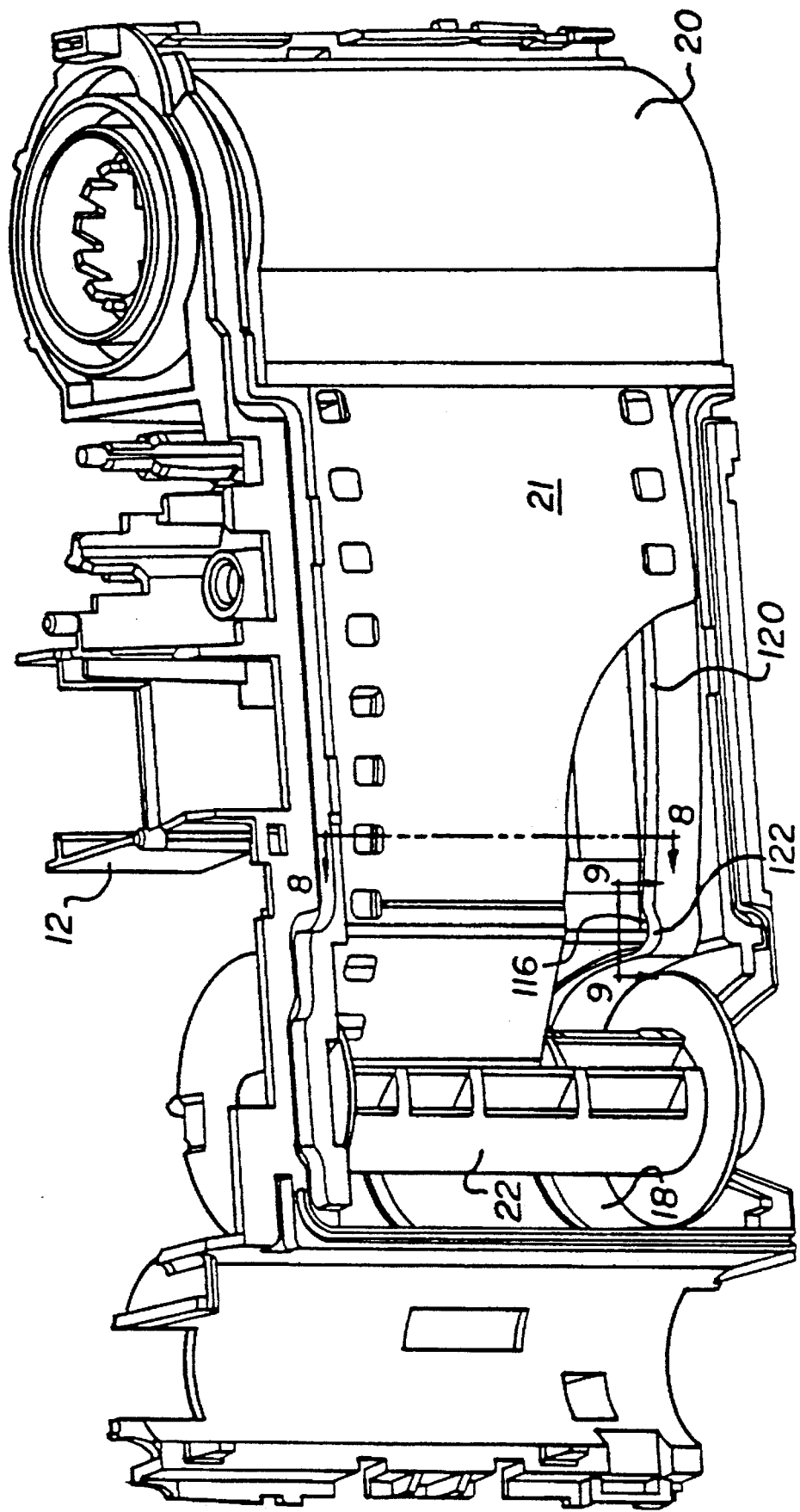
FIG. 7 is the partial top perspective view of the rear of the camera body shown in FIG. 5 illustrating the camera having a loaded filmstrip to be prewound onto a take-up spool and over the light blocking member of the present invention.
Figure 8:
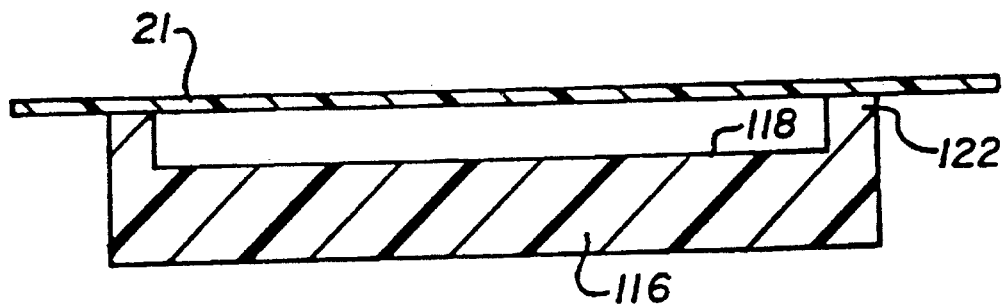
FIG. 8 is a partial sectional view of the light blocking member according to the preferred embodiment taken through line 8—8 of FIG. 7.
Figure 9:
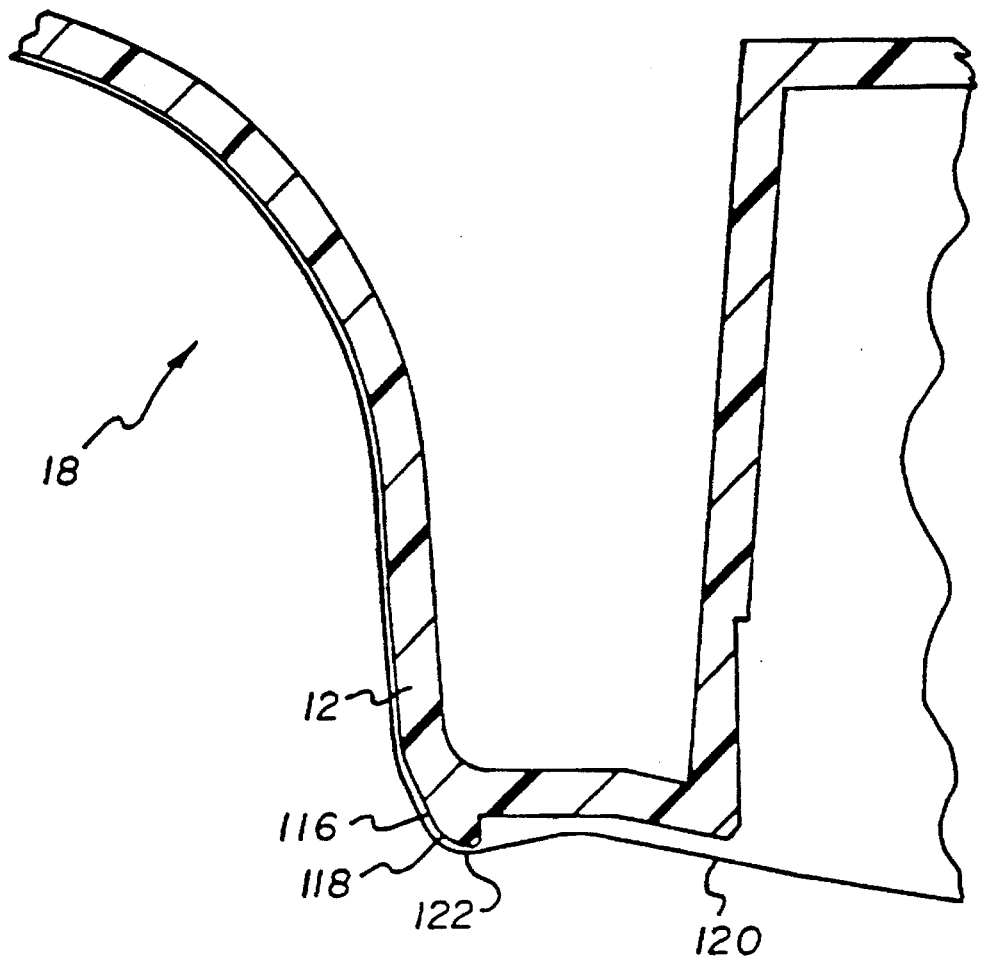
FIG. 9 is a partial sectional view of the light blocking member as taken through line 9—9 of FIG. 7.

As is particularly shown in FIG. 6, an ambient light ray 110 entering the exposure chamber 104 impinges onto the emulsion surface of the film 21, but is no longer reflected into the film roll chamber 18, as previously shown in FIG. 6, due to the first and second stepped portions 118, 122, respectively, of the light blocking member 116, each of which are sufficiently raised from the surface of the camera body to shield the film roll chamber 18 from light entering the exposure chamber 104. The second stepped portion 122, however, is raised a greater distance from the body 12 than the first stepped portion 118.

The enhanced spacing of the second stepped portion 118 of the light blocking member 116 allows the emulsion side of the film 21 to be supported by the second stepped portion 118, rather than having the film surface being supported over its entire width by the light blocking member 116, that is, the first and second stepped portions. Supporting the film 21 as described is advantageous in that scratching or other degradation of the film 21 is minimized as the film passes from and to the film cassette chamber 17 to and from the film roll chamber 18 on prewinding and advancing of the film 21 along the film transport path 102.

In a more preferred embodiment, the second stepped portion 122 includes a curved outer surface 124 to more easily allow film transport across the light shielding member 116 without sticking or otherwise degrading the film 21.

The invention has been described with reference to a preferred embodiment. However, it will be appreciated that variations and modifications can be effected by a person of ordinary skill in the art without departing from the scope of the invention.

PARTS LIST for FIGS. 1–6

- 10 camera
- 12 main body
- 14 front cover
- 16 rear cover
- 17 film cassette chamber
- 18 film roll chamber
- 20 film cassette
- 21 filmstrip
- 22 take-up spool
- 24 exposure gate
- 26 taking lens
- 28 retainer
- 30 support plate
- 32 contact switch
- 34 viewfinder
- 36 shutter release portion
- 38 keeper plate
- 40 shutter blade
- 42 spring
- 44 high-energy lever
- 46 helical spring
- 48 film winding knob
- 50 sprocket
- 52 cam
- 54 metering lever
- 56 spring
- 58 extending portion
- 60 frame counter
- 80 light baffle
- 82 flash illumination assembly
- 84 circuit board
- 86 capacitor
- 88 flash head
- 90 flash battery
- 92 label
- 94 first break-away door
- 96 second break-away door
- 98 battery compartment
- 100 portal
- 102 film transport path
- 104 exposure chamber
- 106 optical axis
- 108 light ray
- 110 light ray
- 112 thickened portion
- 114 film passage
- 116 light shielding member
- 118 first stepped portion
- 120 film rails
- 122 second stepped portion
- 124 surface

I claim:

1. A camera comprising a body having a film roll chamber for holding an unexposed roll of film, an exposure chamber into which ambient light enters through a taking lens to impinge on the film, and light blocking means for preventing light entering through said taking lens from entering said film roll chamber, said exposure chamber being bordered by a pair of film rails for supporting the edges of the filmstrip and for guiding the filmstrip from the film roll chamber to the exposure chamber, is characterized in that:

said light blocking means is integral to said body and includes a stepped piece having a first light blocking step sufficiently raised to prevent light from entering said film roll chamber and a second step raised above said first step for supporting edges of the film, said second step being a raised portion of said film rails to allow said first step to be built up.

2. A method of making a single use camera from previously used camera parts, comprising the steps of:

loading an unexposed roll of film into a film roll chamber of a camera body; and prewinding the unexposed roll of film from the film roll chamber over a stepped piece which is integral to said camera body having a first step which is sufficiently raised to block light which can enter through a taking lens from entering a film roll chamber and a second step which is raised above said first step for supporting the edges of film as it is prewound into the film roll chamber, wherein said second step is a raised portion of a pair of film rails bordering an exposure chamber to allow said first step to be built up to a sufficient height to block light from entering said film roll chamber.

3. A single-use camera with an unexposed roll of film, comprising a body having a film roll chamber for holding the unexposed roll of film, an exposure chamber into which ambient light enters through a taking lens to impinge on the film, a pair of film rails bordering said exposure chamber for guiding the filmstrip between the film roll chamber and a film cartridge chamber, and light blocking means for preventing light entering through said taking lens from entering said film roll chamber, is characterized in that:

said light blocking means is integral to said body and includes a stepped piece having a first light blocking step sufficiently raised to prevent light from entering said film roll chamber and a second film supporting step raised above said first step for supporting edges of the film, wherein said second step is a raised portion of said film rails which allows said first light blocking step to be sufficiently raised to prevent light from entering the film roll chamber.

4. A camera as recited in claim 3, wherein said second step includes a curved outer surface for allowing the film to be easily moved across the light blocking means.

5. A camera comprising a frame having a film roll chamber for holding an unexposed roll of film, an exposure chamber into which ambient light enters through a taking lens to impinge on said film, and light blocking means for preventing light entering through said taking lens from entering said film roll chamber, is characterized in that:

said light blocking means includes a stepped piece adjacent said film roll chamber and integral to said frame having a first step which is sufficiently raised to prevent light from entering said film roll chamber and a second step raised above said first step for supporting edges of said film, said second step being a raised portion of a set of film rails bordering the exposure chamber of said camera to allow said first step to be sufficiently raised to prevent light from entering said film roll chamber.

6. A camera as recited in claim 5, including a rear cover for covering an open side of said film roll chamber and said exposure chamber.

7. A camera as recited in claim 5, wherein said second step of said stepped piece Includes a curved portion for allowing the film to be easily moved from said film roll chamber across the exposure chamber.

* * * * *